Feb. 1, 1944.    F. M. CLARK    2,340,644
SOLID DIELECTRIC
Filed March 31, 1942
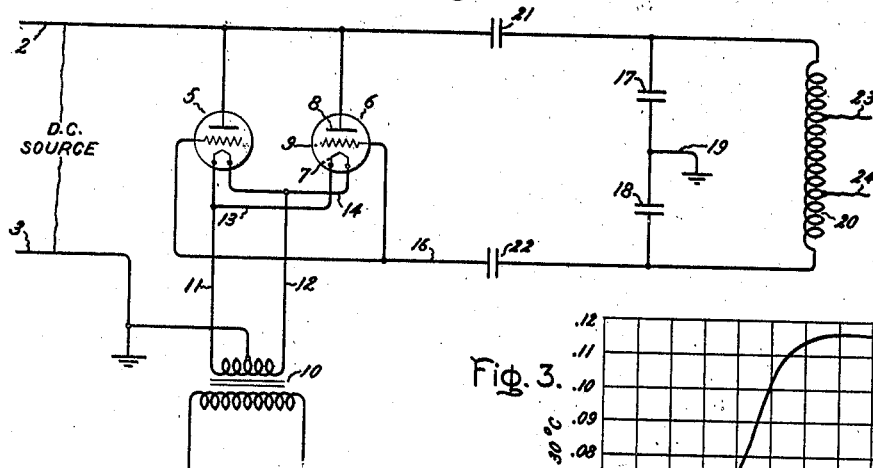
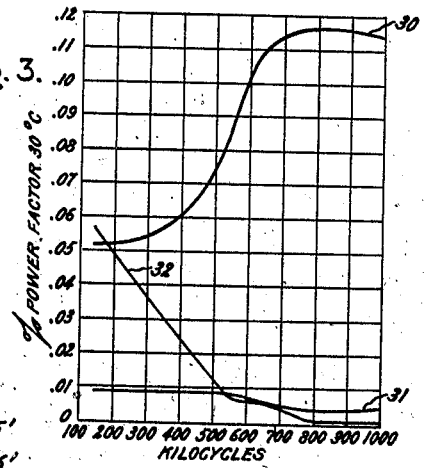
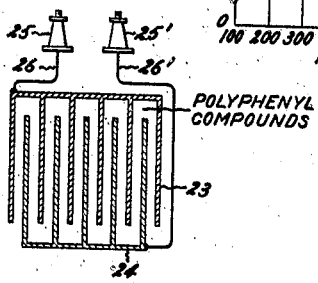
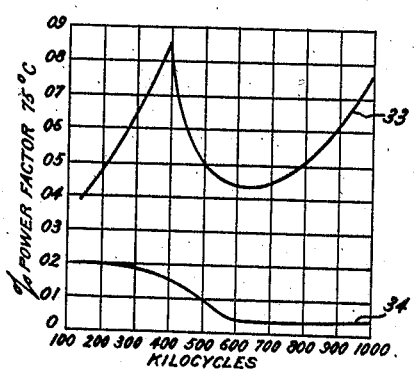
Inventor:
Frank M. Clark,
by Harry E. Dunham
His Attorney.

Patented Feb. 1, 1944

2,340,644

UNITED STATES PATENT OFFICE 2,340,644

SOLID DIELECTRIC

Frank M. Clark, Pittsfield, Mass., assignor to General Electric Company, a corporation of New York Application March 31, 1942, Serial No. 436,929

8 Claims. (Cl. 252—63.2)

The present invention relates to high frequency electric devices, and in particular provides new and improved dielectric elements for such devices.

Heretofore, electric devices, as for example capacitors and cables, when containing dielectric elements which were well adapted for operation at commercial frequency have been found to operate with undesirably high power factors at high frequencies, that is, frequencies of the order of 100 to 5000 kilocycles.

I have discovered that capacitor dielectric elements comprising solid, polynuclear, aromatic hydrocarbons, and in particular compounds of the polyphenyl type, function with good efficiency and low power factors at high frequencies. Polyphenyl compounds, or mixtures comprising such compounds, as for example diphenyl, diphenyl oxide and diphenyl benzene (triphenyl), are preferred as high frequency dielectric elements. Compositions embodying my invention advantageously include by weight at least about 25 per cent of diphenyl benzene.

In the accompanying drawing, Fig. 1 is a conventional representation of a high frequency generator containing high frequency capacitors; and Fig. 2 shows conventionally a high frequency capacitor containing a dielectric element comprising one or more polyphenyl compounds.

Heretofore, mica and fused quartz have been considered the best available dielectric materials for the high frequency field. For various reasons it is desirable to employ a fusible organic material in place of mineral materials, such as mica and quartz. Paraffinic hydrocarbons have been proposed as high frequency dielectrics, but have been found to be unsuited because of their oxidizability. Oxidation products cause the power losses to be increased, the resulting heating in turn promotes further oxidation and thus eventual failure occurs.

Aromatic hydrocarbons of the polynuclear class, and in particular compounds of this class which have a sufficiently high molecular weight to be substantially non-volatile over a working range of about 25 to 100° C., not only are chemically stable and have good dielectric constants, but such compounds are operable with power factors materially lower and less variable than mica. Such compounds are solids at room temperature.

While, in general, polyphenyl compounds or mixtures thereof are preferred, it is advantageous for some purposes to employ dielectric compositions comprising both uncondensed polynuclear hydrocarbons, such as the polyphenyl group and condensed polynuclear hydrocarbons, such as naphthalene.

Fig. 1 shows a high frequency circuit comprising as essential elements supply lines 2, 3 connected to a source of direct current (not shown) and leading to an oscillation circuit to be described. Connected across the circuit 2, 3 are vacuum tubes 5, 6 comprising each as usual a cathode 7, an anode 8 and a grid 9. The anodes are connected to the conductor 2. The cathodes are connected to the conductor 3 through a filament heating transformer 10. Both the conductor 3 and a neutral point of the secondary winding of the transformer 10 are grounded as indicated. The secondary of the transformer 10 is connected by the conductors 11, 12 to filament heating circuit 13, 14. The grids each are connected to the conductor 16 leading to the oscillation circuit. The latter comprises high frequency capacitors 17, 18 connected in series to the conductors 2 and 16, and grounded at the midpoint by a conductor 19. The conductors 2 and 16 are connected also to an inductance coil 20 in series with blocking capacitors 21, 22. A high frequency work circuit 23, 24 is connected in any convenient way to the oscillation coil 20.

High frequency capacitors, such as the capacitor shown in Fig. 2, may comprise interleaved armatures 23, 24 separated by a dielectric medium and connected to the terminals 25, 25' by the conductors 26, 26'. The dielectric medium has been indicated for the sake of clearness only by the label "Polyphenyl compounds." The enclosing casing has been omitted in the interest of simplification.

In accordance with my invention high frequency capacitors are provided with a composition either consisting wholly of one or more polyphenyl compounds or containing such compounds associated with other aromatic compounds, preferably of the polynuclear type. Such compounds are to be understood as being unmodified, that is, uncombined with halogen or other substituted element or group. An example of such a composition is the following three-component mixture:

| | Parts |
|---|---|
| Triphenyl (diphenyl benzene) | 2 |
| Diphenyl | 1 |
| Naphthalene | 1 |

The dielectric strength of this composition varies from about 42 kilovolts at 50° C. to about 43.5 kilovolts at 100° C. The melting point determined by the ball and ring method is about 82° C.

Instead of naphthalene, other condensed polynuclear hydrocarbons such as anthracene and phenanthrene may be associated with the polyphenyl.

Instead of three-component mixtures described above, various two-component compositions of the polyphenyl type may be used, as for example mixtures of (1) diphenyl and triphenyl (diphenyl benzene) and (2) diphenyl and diphenyl oxide. Other polyphenyl compounds are produced in the manufacture of diphenyl such as the tri-, tetra- and pentaphenyl. Such mixtures can be used without separation of their components as dielectric materials for high frequency capacitors in accordance with my invention.

The following table indicates the variation in melting point of several compositions of diphenyl and triphenyl, all of which are capable of use as high frequency dielectric materials:

*Table I*

| Per cent diphenyl | Per cent triphenyl | Melting point |
|---|---|---|
|  |  | °C. |
| 100 | 0 | 71 |
| 75 | 25 | 59 |
| 50 | 50 | 89 |
| 25 | 75 | 112 |
| 0 | 100 | 205 |

Table II shows the melting points of several compositions comprising triphenyl and diphenyl oxide:

*Table II*

| Per cent triphenyl | Per cent diphenyl oxide | Melting point |
|---|---|---|
|  |  | °C. |
| 0 | 100 | 28 |
| 25 | 75 | 55 |
| 50 | 50 | 94 |
| 75 | 25 | 110 |
| 100 | 0 | 205 |

In some cases it is permissible to use two-component mixtures of a polyphenyl and another unlike polynuclear aromatic hydrocarbon. Examples of such compositions are mixtures of 25 parts by weight of triphenyl and 75 parts by weight of naphthalene, having melting point of 108° C., equal parts by weight of these components having melting point of 75° C., and composition of 75 parts by weight triphenyl and 25 parts by weight of naphthalene. The latter melts at 67° C.

The above examples are illustrated only. A wide latitude of dielectric materials, including two or more components of polyphenyl compounds, is within the scope of my invention. For instance, instead of the percentages of the three-component mixtures first given above, I may use a mixture consisting by weight of 40 per cent triphenyl, 35 per cent diphenyl and 25 per cent naphthalene.

The power factors of capacitors containing a dielectric element embodying my invention are lower in the range of high frequencies above indicated over a temperature range of about 30 to 100° C. than dielectric elements such as mica which heretofore have been commonly used for high frequency capacitors. At the frequency of 1000 kilocycles, such compositions operate with power factors below .01 per cent. Such materials have a dielectric strength of 30 kilovolts or higher over the ordinary working temperature range of 30 to 100° C.

In Fig. 3 are shown for comparison purposes power factors in per cent at 30° C. over a high frequency range of 100 to 1000 kilocycles of mica (curve 30), of triphenyl (curve 31), and of a mixture of 70 per cent diphenyl and 30 per cent diphenyl oxide (curve 32). The per cent power factor characteristic at this temperature of diphenyl and diphenyl oxide closely approximates these values. The per cent power factor of diphenyl, for example, is indicated by the following values:

| Frequency in kilocycles | Per cent power factor |
|---|---|
| 140 | .041 |
| 400 | .002 |
| 550 | .002 |
| 650 | .002 |
| 800 | .003 |
| 1,000 | .007 |

The values for diphenyl oxide are as follows:

| Frequency in kilocycles | Per cent power factor |
|---|---|
| 140 | .006 |
| 400 | .010 |
| 550 | .010 |
| 650 | .004 |
| 800 | .004 |
| 1,000 | .005 |

In Fig. 4 are shown for comparison purposes the per cent power factors over the same frequency range, but at 75° C. for mica (curve 33) and triphenyl (curve 34). In both instances the power factor of the latter medium is less variable and of lower relative value than mica. The characteristics of a composition consisting of a mixture of 30 per cent diphenyl oxide and 70 per cent diphenyl are of the same order of magnitude. For example, the per cent power factor of the latter composition at 75° C. is in a range of .014 at 140 kilocycles to .001 at 1000 kilocycles.

What I claim as new and desire to secure by Letters Patent of the United States is:

1. A solid dielectric composition suitable for use in electric capacitors consisting of diphenyl benzene, diphenyl and a condensed polynuclear hydrocarbon.

2. A solid dielectric composition for use in electric capacitors consisting by weight of about two parts of diphenyl benzene, about one part diphenyl and one part naphthalene.

3. A solid dielectric composition suitable for use in high frequency capacitors consisting essentially of a diphenyl benzene and anthracene.

4. A solid dielectric composition suitable for use in high frequency capacitors consisting essentially by weight of about one part of diphenyl benzene and about three parts of naphthalene.

5. Solid dielectric compositions which are suitable for use in high frequency capacitors comprising mixtures of unlike polynuclear aromatic hydrocarbons, one of said hydrocarbons being diphenyl benzene, the latter constituting at least about 25 per cent by weight of the entire composition.

6. Solid dielectric compositions having melting points within a range of about 67 to 108° C. comprising by weight about 25 to 75 parts of diphenyl benzene and about 75 to 25 parts of naphthalene.

7. A solid dielectric composition consisting by weight of about 2 parts of diphenyl benzene, about 1 part of diphenyl, and about 1 part of naphthalene, said composition having a dielectric strength of about 42 kilovolts at 50° C. and a melting point of about 82° C.

8. A solid dielectric composition suitable for use in high frequency capacitors including diphenyl benzene and diphenyl as substantial and essential ingredients.

FRANK M. CLARK.